United States Patent Office 3,103,250
Patented Sept. 10, 1963

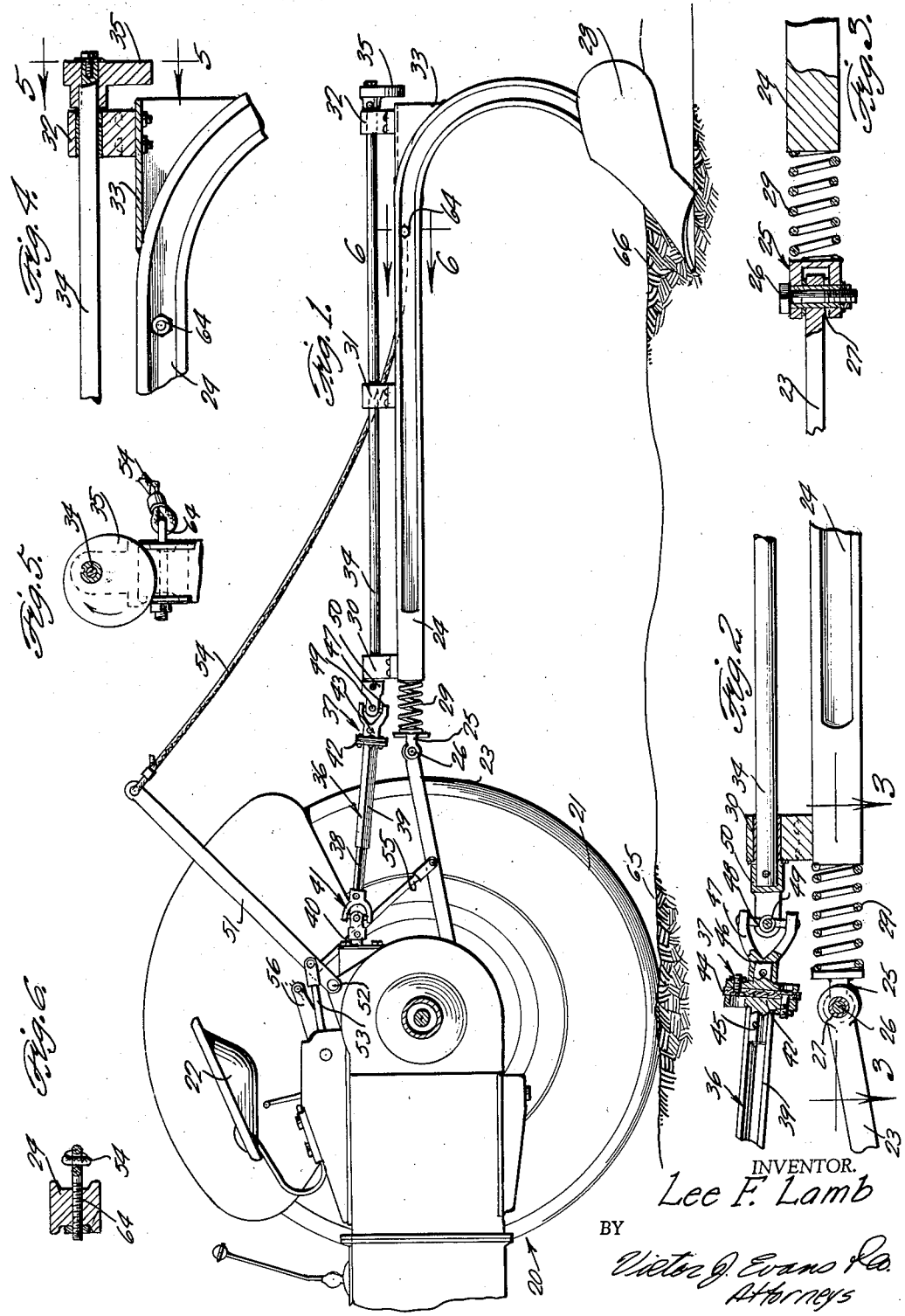

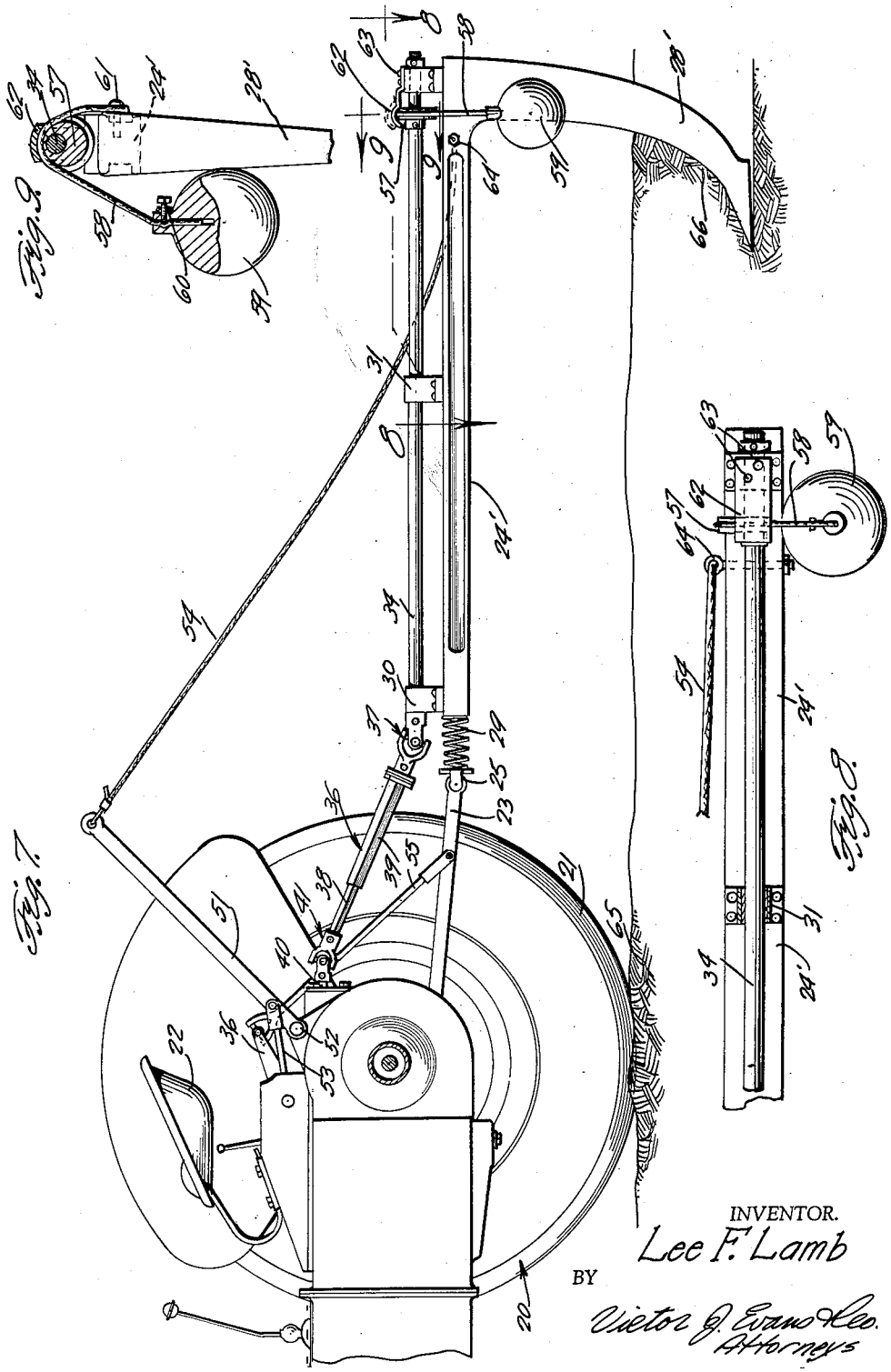

3,103,250
VIBRATING PLOW
Lee F. Lamb, % Lumberton Sales Co., Lumberton, N.C.
Filed Feb. 9, 1962, Ser. No. 172,336
1 Claim. (Cl. 172—40)

This invention relates to an agricultural implement, and more particularly to a vibrating plow which is adapted to be mounted rearwardly of a tractor or other power machine.

The primary object of the present invention is to provide a vibrating plow which is adapted to be pulled or moved through heavy soil with a minimum amount of effort or horsepower, as for example when various types of jobs or tasks are being performed on a farm or the like.

A further object is to provide a vibrating plow of the type stated which in one form of the invention consists of an eccentrically mounted counterweight which serves to impart the desired vibrations to the plow, and wherein in another form of the invention a weighted member is adapted to be actuated in such a manner so as to vibrate the plow in order to permit the plow or earth working implement to be readily pulled or moved through heavy soil or the like with a minimum amount of power required to carry out the desired work.

Another object is to provide an apparatus of the character described that may be utilized speedily and with precision by even inexperienced operators.

Further objects and advantages are to provide improved elements and arrangements thereof in a device of the charatcer described that is economical to produce, durable in form, and conducive to the most economical use of materials and uniformity of members formed therefrom.

Still further objects and advantages will become apparent in the subsequent description in the specification.

In the drawings:

FIGURE 1 is a fragmentary side elevational view illustrating the vibrating plow construction of the present invention.

FIGURE 2 is an enlarged elevational view, with parts broken away and in section, showing certain constructional details of the present invention.

FIGURE 3 is a sectional view taken on the line 3—3 of FIGURE 2.

FIGURE 4 is an enlarged fragmentary sectional view showing the eccentrically mounted counterweight.

FIGURE 5 is a sectional view taken on the line 5—5 of FIGURE 4.

FIGURE 6 is a sectional view taken on the line 6—6 of FIGURE 1.

FIGURE 7 is a view generally similar to FIGURE 1 but illustrating a modification.

FIGURE 8 is a sectional view taken on the line 8—8 of FIGURE 7.

FIGURE 9 is a sectional view taken on the line 9—9 of FIGURE 7.

Referring in detail to the drawings, and more particularly to FIGURES 1 through 6 of the drawings, the numeral 20 indicates a portion of a conventional tractor which includes the usual rear wheels 21 as well as a seat 22, and the numeral 23 indicates a bar which is mounted at the rear of the tractor 20, FIGURE 1.

A beam 24 is spaced rearwardly of the bar 23, and the beam 24 has a plow or earth working implement 28 connected to the rear portion thereof.

The numeral 25 indicates a bracket which is hingedly or pivotally connected to the rear of the bar 23 as for example by means of a bolt or pin 26, FIGURE 3, and a bearing 27 is circumposed on the bolt 26. The numeral 29 indicates a spring member which is interposed between the bracket 25 and the beam 24, and the spring member 29 is secured as by welding to the bracket and beam, as for example as shown in the drawings.

Supported above the beam 24 are spaced apart bearings 30, 31 and 32, and the bearing 32 may be mounted on a support portion 33 which is secured to or formed integral with the upper rear portion of the beam 24, FIGURE 1. The numeral 34 indicates a driven shaft which is rotatably supported by the bearings 30, 31 and 32, and an eccentrically mounted counter weight 35 is suitably affixed to the rear end of the driven shaft 34, for a purpose to be later described.

There is further provided a drive shaft which is indicated generally by the numeral 36, and the drive shaft 36 is connected to the driven shaft 34 as for example by means of a coupling or shock clutch 37. The drive shaft 36 includes telescoping members 38 and 39. The member 38 is adapted to be connected to the usual power take-off of the tractor 20, as for example by means of a coupling or joint 41.

As shown in FIGURE 2 the coupling 37 consists of contiguous plate members 42 and 43 which have a spacer 44 therebetween, and the spacer 44 may be made of a suitable yieldable material, and stub shafts 45 and 46 are secured to or formed integral with the plates 42 and 43. The yoke 47 is adapted to be suitably affixed to the stub shaft 46, and a pin 48 is suitably affixed to the yoke 47, and the pin 48 is swivelly connected as at 49 to an end piece 50, and the end piece 50 is suitably affixed to the front end of the driven shaft 34, FIGURE 2.

The numeral 51 indicates the usual linkage at the rear of the tractor 20, and the linkage 51 is adapted to be pivotally connected to the tractor as at 52, and a conventional hydraulic mechanism 53 is adapted to be actuated for causing pivotal movement of the linkage 51. A cable 54 has one end thereof connected to the link 51, and the other end of the cable 54 is anchored to the beam 24, as for example by means of a securing element 64, FIGURE 6.

The numeral 55 indicates an arm or rod which has its lower end suitably anchored or affixed to the bar 23, and there is provided a conventional hydraulic mechanism 56 for moving the rod 55, and this construction provides a means whereby the entire plow assembly can be raised or lowered as desired or required, so that for example an efficient depth control arrangement is provided.

Referring now to FIGURES 7, 8 and 9 of the drawings, there is illustrated a modification and in FIGURES 7, 8 and 9 instead of using the eccentrically mounted counterweight 35, a different means is provided for vibrating the plow or earth working implement 28' on the rear of the beam 24'. Thus, it will be seen that the pulley 57 is eccentrically mounted on the shaft 34, and the numeral 58 indicates a cable or line which is arranged in engagement with the pulley 57. One end of the line 58 is anchored as at 60 to a spherical weighted body member 59 and the other end of the line 58 is anchored as at 61 to the beam. The numeral 62 indicates a spring member or spring element which serves to maintain the proper amount of pressure on the line 58, and the spring element 62 is secured in place as at 63.

From the foregoing, it is apparent that there has been provided a vibrating plow, and in use, with the parts arranged as shown in the drawings and in particular as shown in FIGURES 1 through 6 of the drawings, when the tractor such as the tractor 20 is moved along the ground such as the ground indicated by the numeral 65, the earth working element or plow 28 will engage the soil such as the soil indicated by the numeral 66, and the plow 28 can be used in the usual manner for cultivating the soil 66 or for working the ground for any other purpose. As the tractor 20 moves along the ground 65, the beam 24 will be towed or pulled therebehind, whereby the plow 28 will engage the soil or ground 66 in the desired manner. At the same time, with the power take-off 40 actuated, the drive shaft 36 will be rotated from the power take-off 40 through the coupling 41, and with the drive shaft 36 coupled as at 37 to the driven shaft 34, it will be seen that this actuation of the power take-off 40 will result in corresponding rotation of the driven shaft 34. As the shaft 34 rotates, it causes corresponding rotation of the eccentrically mounted counterweight 35, and since the counterweight 35 is eccentrically connected to the shaft 34 as for example as shown in FIGURE 5, it will be seen that this eccentric mounting of the counterweight 35 will set up vibrations and these vibrations will be transmitted through the beam 24 and associated parts to the plow 28 so that the plow 28 will be vibrated, and this vibratory effect will serve the beneficial purpose of insuring that the plow 28 can be pulled through the soil 66 with the minimum amount of power or friction. In addition, the application of the vibrations to the plow 28 serve to help insure that dirt or soil will not have a tendency to cling to the plow 28 so that the plow 28 will have a tendency to remain relatively clean and free of soil or dirt whereby the plow can perform the cultivating job in the most expeditious and efficient manner.

The spring 29 helps provide a resilient or shock absorbing mounting for the beam 24 and the spring 29 insures that there will be sufficient "give" in order to prevent breakage of the parts and in order to insure that the vibrations on the plow 28 will not necessarily be transmitted to the linkage such as the linkage 23.

The coupling 37 also functions as a shock absorber and the coupling 37 is constructed so that the shaft 34 can pivot or move independently of the shaft 36 whereby the plow and its supporting structure can be readily adjusted or moved to different positions as desired or required. The coupling 41 also permits swinging or pivotal movement of the shaft 38 relative to the power take-off 40. The shaft 36 includes the telescoping members 38 and 39 which serve to automatically adjust the proper length in order to compensate for variations that may occur during the use of the apparatus of the present invention.

The arm 51 as well as the arm or bar 23 can be raised or lowered as for example by means of a conventional hydraulic actuating mechanism which is indicated generally by the numerals 56 and 53 so that for example by properly actuating such hydraulic units, the elements 51 and 23 can be pivoted in a counter-clockwise direction, FIGURE 1, whereby the cable 54 will have the effect of raising the beam 24 upwardly since the cable 54 is anchored as at 64 to the beam 24, and this arrangement or construction provides a means for adjusting for the depth of cultivation by the plow 28.

The parts can be made of any suitable material and in different shapes or sizes.

In FIGURES 7, 8 and 9 there is illustrated a modified means for vibrating a plow such as the plow 28', and it will be seen that in FIGURE 7, 8 and 9, the weighted body member 59 is connected to the line or cable 58, so that with the shaft 34 rotated from the shaft 36 through the medium of the coupling 37, it will be seen that the pulley 57 will be rotated, and the pulley 57 is mounted off center or eccentrically on the shaft 34, as for example as shown in FIGURE 9. As the shaft 34 rotates, and with the parts arranged as shown in FIGURES 7, 8 and 9, the pulley 57 will be rotated, and with the pulley 57 mounted off center or eccentrically on the shaft 34, it will be seen that the line or cable 58 will be moved in such a manner that it will cause the member 59 to be alternately picked up and dropped so that the member 59 will continually strike against the plow 28' in order to vibrate the plow 28' in the desired manner so that the plow 28' can be moved through the soil 66 with a minimum amount of power supplied from a machine such as the tractor 20. The spring member 62 serves to maintain slight pressure downwardly on the line 58 so as to help insure that the line 58 will be acted on in the desired manner by the rotating eccentric pulley 57 in order to set up vibrations in the plow 28' as the member 59 moves into and out of engagement with the side of the plow 28'.

The present invention is constructed so that the full effect of all of the vibratory motions set up will be transmitted to the plow.

FIGURE 1 illustrates a type of plow 28 that is adapted to be used in cultivating the ground, while FIGURE 7 indicates a type of plow that can be used for making ditches as for example when tiles, pipe lines or the like are to be laid in the ground. The plows or earth working implements are adapted to be used as sod busters and the vibratory effect will serve to keep the plows clean and help insure the plows can be pulled through the soil with a minimum amount of effort or power.

The eccentric 35 is arranged so that its center of gravity is off center so that as the shaft 34 rotates, vibrations will be caused which will be transmitted to the plow. The members such as the members 37 and 29 prevent the vibrations from being transferred to the tractor. The vibrations transmitted to the plows will serve to insure that the plows can be pulled or moved through heavy soil with a minimum amount of horsepower.

Although the invention herein described is fully capable of achieving the objects and providing the advantages hereinbefore mentioned, it is to be understood that it is merely illustrative of the presently preferred embodiment of the invention and that the invention is not to be limited to the details of construction herein described other than as defined in the appended claim.

What is claimed is:

In an earth working apparatus adapted to be attached to a tractor, said tractor having a power takeoff, said apparatus including a horizontally disposed beam, an upright plow dependingly carried by said beam, a plurality of bearings carried by said beam, and a horizontally disposed shaft rotatable in said bearings and having one end adapted for connection to said tractor power takeoff, a pulley eccentrically mounted on the other end of said shaft, a cable having a midpart traveling over said pulley, one end of said cable being secured to said plow adjacent the upper end of the latter, and a weight disposed below said beam and in abutting relation with respect to said plow, said weight being secured to the other end of said cable so that upon rotation of said shaft said weight is alternatingly lifted and dropped into knocking engagement with said plow.

References Cited in the file of this patent

UNITED STATES PATENTS

| 1,122,584 | Garst | Dec. 29, 1914 |
| 2,607,276 | Morton | Aug. 19, 1952 |
| 2,792,769 | Harshberger | May 21, 1957 |
| 2,973,817 | Monthei et al. | Mar. 7, 1961 |

FOREIGN PATENTS

| 964,701 | France | Feb. 1, 1950 |
| 519,046 | Great Britain | Mar. 14, 1940 |
| 580,703 | Italy | Aug. 9, 1958 |